(12) United States Patent  (10) Patent No.: US 9,169,967 B2
Waniga  (45) Date of Patent: Oct. 27, 2015

(54) HANGER FOR MOUNTING OBJECTS OF VARIOUS SHAPES AND SIZES

(71) Applicant: Trina Waniga, Marion, MA (US)

(72) Inventor: Trina Waniga, Marion, MA (US)

( * ) Notice: Subject to any disclaimer, the term of this patent is extended or adjusted under 35 U.S.C. 154(b) by 0 days.

(21) Appl. No.: 13/676,266

(22) Filed: Nov. 14, 2012

(65) Prior Publication Data

US 2014/0131533 A1   May 15, 2014

(51) Int. Cl.
*A47F 7/14*   (2006.01)
*A47G 1/16*   (2006.01)
*F16M 13/02*  (2006.01)
*A47F 5/08*   (2006.01)

(52) U.S. Cl.
CPC ............... *F16M 13/022* (2013.01); *A47F 5/08* (2013.01); *F16M 13/02* (2013.01)

(58) Field of Classification Search
CPC ......... F16M 13/022; F16M 13/02; A47F 5/08
USPC .................. 248/488, 499, 490; 40/155, 152.1
See application file for complete search history.

(56) References Cited

U.S. PATENT DOCUMENTS

| | | | | |
|---|---|---|---|---|
| 2,209,972 | A * | 8/1940 | Horwitt | 40/739 |
| 2,488,342 | A * | 11/1949 | Spaeth | 188/210 |
| 2,826,384 | A * | 3/1958 | Brown | 248/491 |
| 3,676,944 | A * | 7/1972 | Eubank, Jr. | 40/793 |
| 3,958,352 | A * | 5/1976 | Eubank, Jr. | 40/793 |

* cited by examiner

*Primary Examiner* — Amy Sterling

(57) ABSTRACT

The invention relates to a hanger for mounting objects of various shapes and sizes on vertical, sloping or horizontal surfaces. The hanger comprises a frame formed by two opposing parts adapted to grip the object, and linked together by an adjustable length of cord so that the frame can be made to fit precisely the object to be hung. The disadvantages of the prior art hangers that rely on springs to provide for the adjustment needed for them to fit a range of sizes will be overcome.

3 Claims, 3 Drawing Sheets

Front View of Patent Application 13/676,266

Figure 1:
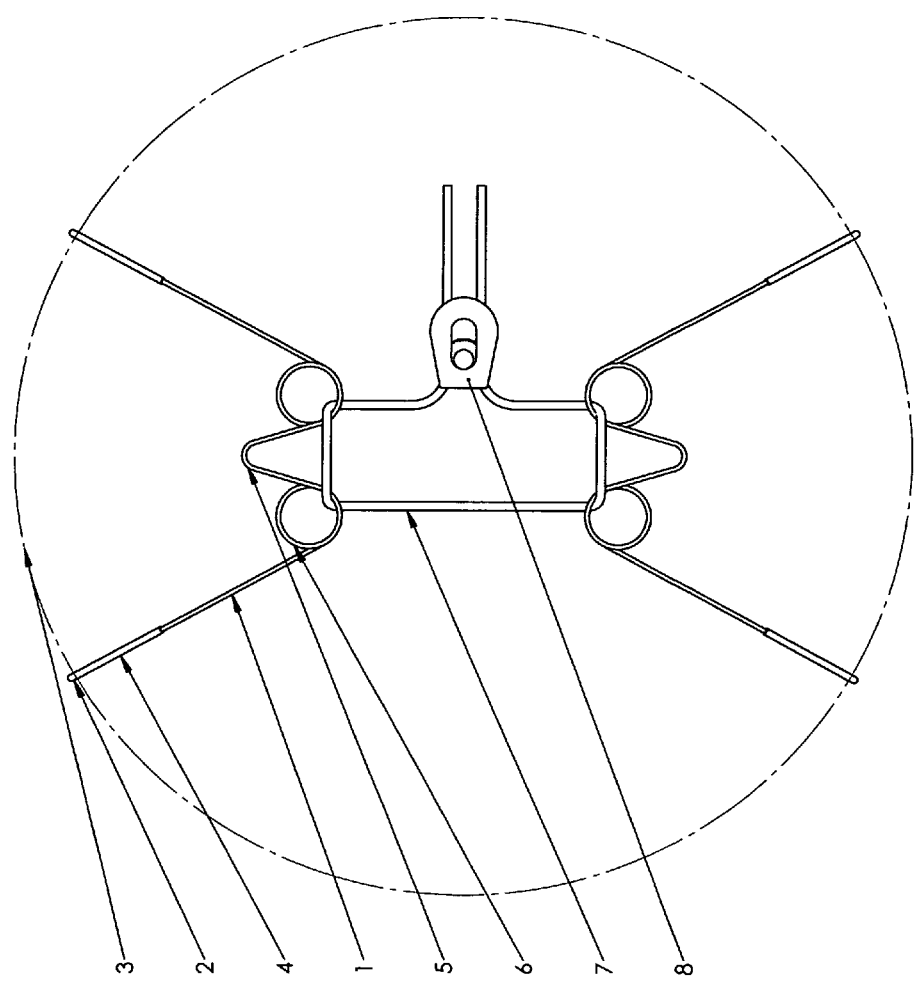

FIG. 1 Front View of Patent Application 13/676,266

Figure 2:
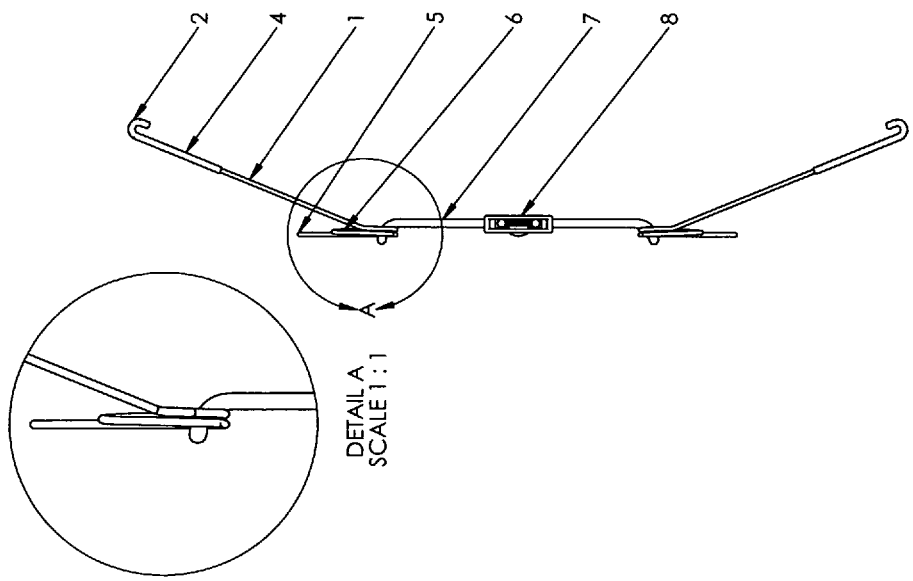

FIG. 2 Side View of Patent Application 13/676,266

HANGER FOR MOUNTING OBJECTS OF VARIOUS SHAPES AND SIZES

BACKGROUND OF THE INVENTION

This invention relates to a hanger for securely mounting objects of various shapes and sizes on vertical, horizontal or sloping surfaces. Hangers currently marketed for mounting objects, primarily circular plates on walls, rely on the use of springs to provide for the adjustment needed for them to fit a fixed diameter range of plate sizes. These hangers are difficult to assemble. If the plates are initially not securely gripped, the springs may retract with force and the users frequently suffer pinched fingers and the plate may be broken. The Inventor's Design Registration U.S. D534,004 illustrates a hanger in which a bungee cord has been substituted for the springs, which makes it a little easier to install, but the size of an object that can be mounted using any hanger of the prior art is limited by the maximum possible extension of the springs or bungee cord. In addition, when the springs or the bungee cord are extended to or near to their limits, significant pressure may be exerted on and may cause damage to the object being hung. Hangers of the present invention may be easily and safely assembled to fit precisely objects of a wider range of sizes and shapes than hangers of the prior art without the risk of exerting damaging pressure thereon.

BRIEF SUMMARY OF THE INVENTION

A hanger according to the invention for mounting an object on a vertical, horizontal or sloping surface comprises a frame consisting of two separate opposing parts, each part being configured to provide at each end a hook or like means for gripping said object, a central section shaped to engage a mounting pin the like projecting from said surface, an aperture on each side of the central section, and means permitting lockable adjustment of a length of cord threaded through all said apertures to link the parts, whereby the spacing between the parts can be varied. Thus the hanger of the present invention can be easily and safely assembled to fit precisely objects of a variety of shapes and sizes without exerting potentially damaging pressure on them.

The means permitting lockable adjustment of the length of cord could of course be simply a knot, but is preferably a cord fastener of the kind described in U.S. Pat. No. 3,564,670 which comprises a housing, one end of which is wider than the other, and a clamping roller longitudinally moveable within the housing. The two ends of the cord can be passed freely through the housing, one on each side of the roller, when it is located at the wider end of the housing, but can be clamped to lock them in place against the inner walls of the housing when the roller is moved to its' narrower end.

Each frame part may be made, conveniently and inexpensively, from a single length of wire of adequate strength fashioned into the shape required. As shown in drawings the shape may be an approximate W, the apertures through which the cord is passed being formed by looping the wire. For hanging heavy objects, the two loops of each frame part may be braced so as to maintain them a fixed distance apart under stress. Twenty-two (22) (0.06") gauge stainless steel wire and Three Thirty-second (3/32) inch braided nylon cord have been found to work well.

In order to protect the object to be hung from being damaged, the end sections of the frame parts, including the hooks, may be coated with plastic material. The frame parts may also be stamped or die cut from sheet metal or plastic with holes in place of the loops.

Objects such as plates, bowls, platters and trays having a rim can be securely mounted by engaging the hooks of the frame parts with their rims. Pictures may be mounted by engaging the edges of their frames with the hooks of the hanger frames or, if desired, by providing rings on the backs of their frames for receiving the hooks. Irregularly shaped objects such as stuffed toys or vases can also be hung without risk of damaging them since the hooks need only exert minimal pressure.

When objects are mounted on vertical surfaces, only one of the central sections will be in use. In order to adapt the hanger for securely mounting objects on horizontal or sloping surfaces, the central section of each part of the frame may be fashioned in the shape of a keyhole with both narrow ends of the keyholes pointing in the same direction. The wide ends of the keyholes may then be pushed over pins projecting from the horizontal or sloping surface, and the frame with the object attached then slid to one side to lock in place.

Figure 3:
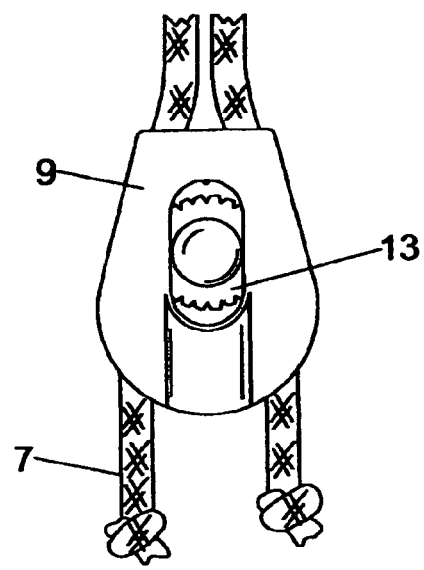
Figure 4:
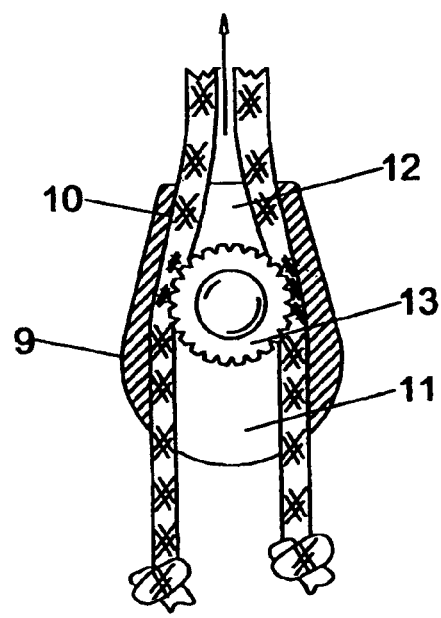

A preferred embodiment of the invention is illustrated in Figs.1 to 4 in which FIG. 1 is a frontal view of the frame mounted on the back of a plate, FIG. 2 is a side view, FIG. 3 is an enlarged view of the fastener 8 of FIG.1 and FIG. 4 is a longitudinal section of FIG. 3.

DETAILED DESCRIPTION OF THE INVENTION

As shown in FIGS. 1 to 3, each frame part is fashioned from a single piece of Wire1, the ends of which are bent to form hooks 2 for gripping the rim 3 of a plate. The ends of the wire, including the hooks, are provided with a plastic coating 4. On each side of the central section 5, the wire is formed into a loop 6 through which a cord 7 is passed. The ends of the cord 7 are threaded into a reversible locking device or fastener 8. With reference to Figs 4 and 5 of the drawings, the fastener comprises a housing 9, one end 11 of with is wider than the other end 12, and a clamping roller 13 located and movable longitudinally within the housing. The two ends of the cord 7 can be passed freely through the housing, one on each side of the roller when it is located at the wide end 11 of the housing, but when it is moved to the narrow end 12 of the housing the ends of the cord 7 are clamped against the inner wall 10 of the housing and locked in place. Thus the length of the cord linking the the loops 6 can be adjusted to vary the spacing between the opposing frame parts.

The invention claimed is:

1. A hanger for mounting an object on a vertical, horizontal or sloping surface comprising two separate opposing parts, each part being formed from a single piece of wire, each piece of wire being configured to provide means at each end for gripping said object, a central section shaped to engage a mounting pin on said surface, and a loop on either side of the central section, a cord extending through all four loops to link the parts together, and a fastener through which the free ends of the cord are threaded, said fastener comprising a housing, one end of which is wider than the other, and a clamping roller located and longitudinally movable within the housing whereby when said roller is located at the wide end of the housing the ends of the cord can be moved freely through the housing, one on each side of said roller, and when said roller is located at the narrow end of the housing the ends of the cord are clamped against the inner wall of the housing and locked against further movement, thereby permitting the length of cord linking the opposing parts to be adjusted and the spacing between the opposing parts to be varied to fit precisely a range of object sizes.

2. A hanger according to claim 1 wherein the wire is 22(.06") gauge stainless steel wire.

3. A hanger according to claim 1 wherein the cord is 3/32" braided nylon cord.

* * * * *